United States Patent [19]

Maris

[11] Patent Number: 4,563,684
[45] Date of Patent: * Jan. 7, 1986

[54] METHOD OF PREDICTING THE APPROACHING STALL OF AN AIRCRAFT WING

[75] Inventor: John M. Maris, Port Orange, Fla.

[73] Assignee: Marinvent Corporation, Toronto, Canada

[*] Notice: The portion of the term of this patent subsequent to Mar. 6, 2001 has been disclaimed.

[21] Appl. No.: 538,255

[22] Filed: Oct. 3, 1983

Related U.S. Application Data

[63] Continuation-in-part of Ser. No. 219,188, Dec. 22, 1980, Pat. No. 4,435,695.

[30] Foreign Application Priority Data

Dec. 24, 1979 [GB] United Kingdom ................. 7944397

[51] Int. Cl.$^4$ ............................................. G08B 23/00
[52] U.S. Cl. .................................... 340/966; 340/525; 73/147; 244/194; 324/65 R
[58] Field of Search ............... 340/966, 963, 606, 525; 364/426; 244/182, 191, 192, 194; 73/178 R, 178 T, 179, 147, 204; 324/65 R

[56] References Cited

U.S. PATENT DOCUMENTS

| | | | |
|---|---|---|---|
| 2,431,241 | 11/1947 | Godsey | 340/966 |
| 2,596,116 | 5/1952 | Bamber | 340/966 |
| 2,603,695 | 7/1952 | Campbell | 340/966 |
| 2,638,579 | 5/1953 | Dyche et al. | 340/966 |
| 2,748,372 | 5/1956 | Bunds, Jr. | 340/966 |
| 3,079,105 | 2/1963 | Raspet | 340/966 |
| 3,426,322 | 2/1969 | Balo | 340/966 |
| 3,868,625 | 2/1975 | Speigner et al. | 340/966 |
| 4,229,725 | 10/1980 | Reilly | 340/966 |

*Primary Examiner*—Donnie L. Crosland
*Attorney, Agent, or Firm*—Jordan and Hamburg

[57] ABSTRACT

The approaching stall of an aircraft wing is predicted using an inherent characteristic of the airflow as the stall is approached. The airspeed over the wing is sensed at a predetermined location spaced above the top surface of the wing, input signals are produced representative of airspeed fluctuations caused by air turbulence, input signals are used to produce a signal representative of the ratio of the airspeed fluctuations to the average airspeed, and the ratio signal produces a signal indicating imminent stalling.

6 Claims, 24 Drawing Figures

METHOD OF PREDICTING THE APPROACHING STALL OF AN AIRCRAFT WING

BACKGROUND OF THE INVENTION

The present invention relates to a method of predicting the approaching stall of an aircraft wing.

An artificial stall warning device is almost universally fitted to transport aircraft. The role of the equipment is to augment, or substitute for, the natural stall symptoms, which may vary according to the aircaft configuration, weight, attitude, and the manoeuvre being performed. Surprisingly, even complex aircraft often have to rely on basic stall detection devices. These fall generally into two groups:

1. Those actuated by a hinged vane mounted on the leading edge of the wing, sensitive to the position of the stagnation point of the airflow.
2. The more sophisticated angle-of-attack systems.

The wing leading edge device senses the movement of the stagnation point as it transitions from above the vane to below it, as the stall is approached. Inherent in such a system are several disadvantages:

1. The vane is very prone to interference from gusts, and, in addition, is badly affected by transient g-loadings that arise in turbulence. low speeds (where a given gust velocity is a greater percentage of the aircraft speed, and the inertia of the machine is low, which compounds the g-loading problem). Because of this, the system is most likely to be ignored just when it is most needed during take-off and landing. At best, the spurious warnings are distracting at a critical time.
2. A problem arises because of the limited number of vanes that are fitted to the aerofoil. Having just one or two sensors is undesirable because only a small part of the airflow is sampled. In fact, a second vane is often required because a single unit cannot cope with changes of aircraft configuration (the lowering of flap, for example). This serves to highlight the inherent inflexibility of such a system.
3. Another serious problem relates to flight through icing conditions, which may alter the performance of the device in several ways, even if the vane itself is heated. When an aerofoil ices up, its profile is altered. The result may be that the stalling incidence (angle-of-attack) is reduced. The vane is then referenced to the wrong stalling angle, so that no warning may be provided even though the wing may have stalled. A similar situation arises for different reasons due to the locally disturbed flow at the wing leading edge. Flow distortion influences the position of the stagnation point so that the system again becomes inaccurate.
4. There is a further problem during take-off. While the aircraft is on the ground, the incidence is basically dictated by the geometry of the aircraft. Until the nose of the aircraft is raised (termed "rotation"), an angle-of-attack sensor cannot operate. If a wing is iced up, take-off may be possible due to the ground effect, but no stall warning would be given until too late—it is procedurally incorrect to abort once rotation has started.

These last three problems arise because the sensor is calibrated for only one given situation. The system response does not adapt to altering circumstances, and indeed it cannot. It is not what might be called an 'intrinsic' stall warning device. The position of the stagnation point may or may not give valid information about the stall.

Even the angle-of-attack sensor is open to similar criticism. Although local flow disruption influences the system less, it is nevertheless unable to sense a change of situation and respond accordingly.

The present invention seeks to provide a system which is dependent on an inherent characteristic of the airflow as a stall is approached.

THE INVENTION

The present invention provides a method and apparatus for predicting the approaching stall of an aircraft wing, in which the airspeed over the wing is sensed at a predetermined location spaced above the top surface of the wing to produce input signals representative of airspeed fluctuations at said location, which fluctuations are caused by air turbulence over the wing, and the input signals are used to produce a signal indicative of imminent stalling when the air turbulence exceeds an airspeed dependent threshold or the input signals are used to produce a signal representative of the ratio of the airspeed fluctuations to the average airspeed and the ratio signal is used to produce a signal indicative of imminent stalling.

EXPERIMENTS AND PRACTICAL EMBODIMENT

Experiments were carried out to establish the feasibility of the invention, and a practical embodiment has been devised. The experiments and the practical embodiment are described below, by way of example, with reference to the accompanying drawings, in which:

FIG. 2b is a diagrammatic vertical section along the line IIb—IIb in FIG. 2a;

EXPERIMENTAL WORK

The experiments were conducted under two-dimensional conditions in a low speed 3×3 wind tunnel, using a symetrical NACA 0010 aerofoil or wing section. This was chosen because of its sharply defined stalling characteristics. Details of the mounting arrangements and model configuration can be seen in FIGS. 1, 3 and 4.

Figure 1:
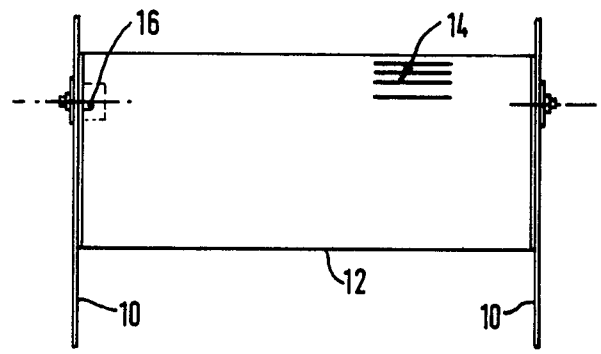
FIG. 1 is a plan view showing details of an aerofoil (wing section) used in experiments.
Figure 2A:
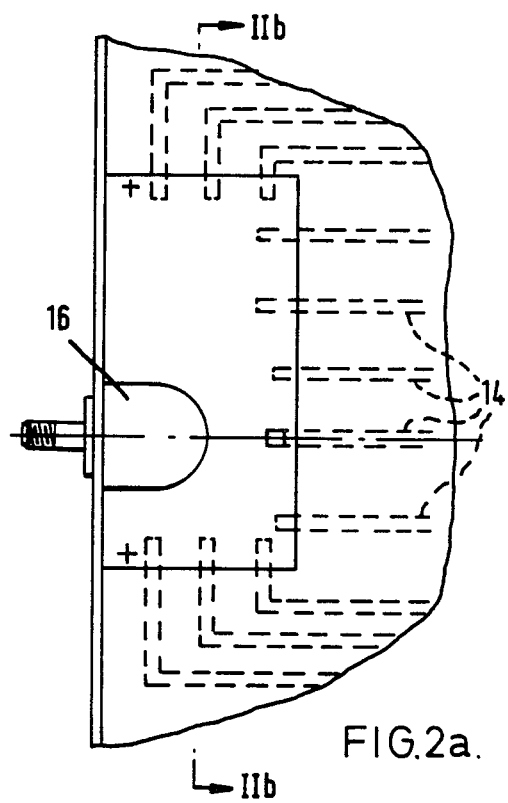
FIG. 2a is a diagrammatic plan view, on a larger scale, showing pressure tube connections in the aerofoil of FIG. 1.
Figure 2B:
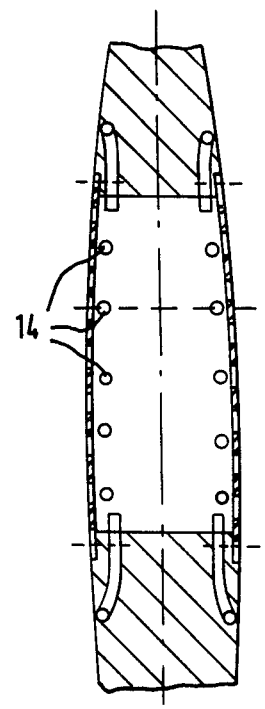

As may be seen from FIG. 1, rectangular end plates 10 are fitted to the wing section 12 to render the flow two-dimensional. The wing section 12 is also provided with pressure tubes 14, described below (not all these are shown in FIG. 1, 2a and 2b, which are schematic in this respect) and a pressure tube exit opening 16 on the underside of the wing section 12 is also shown in FIGS. 1 and 2a, for the exit of thin flexible tubes (not shown) connected to the pressure tubes 14.

Figure 3:
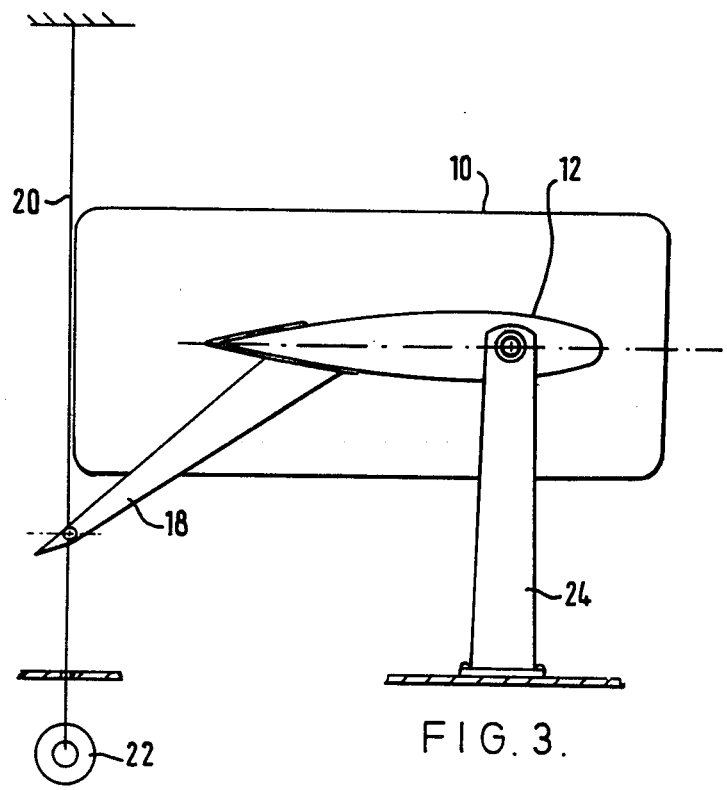
FIG. 3 is a side elevational view showing the mounting arrangement for the aerofoil.

As shown in FIG. 3, the wing section 12 is provided with a tail sting 18 which is supported from the roof of the tunnel by a cable 20, tensioned by tension weights 22. The wing section 12 is supported towards the front by struts 24, one on either side of the wing section.

The wing section 12 was fitted with a set of seventeen static-pressure taps on each of the top and bottom surfaces, with provision for several such sets across the span. In order to minimise interference effects, a site was selected at approximately 80% span, as far away as possible from both the tail sting 18 and the adjacent end plate 10. All the remaining taps were sealed off with adhesive tape.

The chordwise pressure-tap locations are shown in the Table below. c is the chord length, x is the distance from the leading edge of the wing section.

TABLE

| Chordwise pressure-tap locations x/c | |
|---|---|
| Upper surface | Lower surface |
| 0.0 | 0.0 |
| 0.0125 | 0.0125 |
| 0.0300 | 0.0300 |
| 0.0500 | 0.0500 |
| 0.0750 | 0.0750 |
| 0.1000 | 0.1000 |
| 0.1500 | 0.1500 |
| 0.2000 | 0.2000 |
| 0.2500 | 0.2500 |
| 0.3000 | 0.3000 |
| 0.4000 | 0.4000 |
| 0.5000 | 0.5000 |
| 0.6000 | 0.6000 |
| 0.7000 | 0.7000 |
| 0.8000 | 0.8000 |
| 0.8500 | 0.9000 |
| 0.9300 | 0.9400 |

The taps were connected to a multi-tube manometer, which included two tubes for the measurement of static and total pressures in the tunnel. These were connected in parallel to a Betz manometer to facilitate the setting up of a desired wind speed.

The velocity of the airflow was sensed by heated body probe means in the form of a hot-wire probe mounted on an aluminium channel from the roof of the tunnel. In a hot-wire probe, a current is passed through a wire; the temperature of the wire is automatically at a constant value, normally of several hundred degrees centigrade; the varying current required to do this is sensed, giving instantaneous input signals of airspeed or velocity. Thus the probe senses speed or speed fluctuations directly and does not sense pressure. Normally, hot-wire probes have a very high frequency response and are capable of measuring the variations in airspeed that occur in air turbulence—it is believed that fluctuations of up to 50,000 Hz or more can be measured in a practical embodiment. The probe output was electrically processed to yield the required information, as detailed later.

Figure 4:
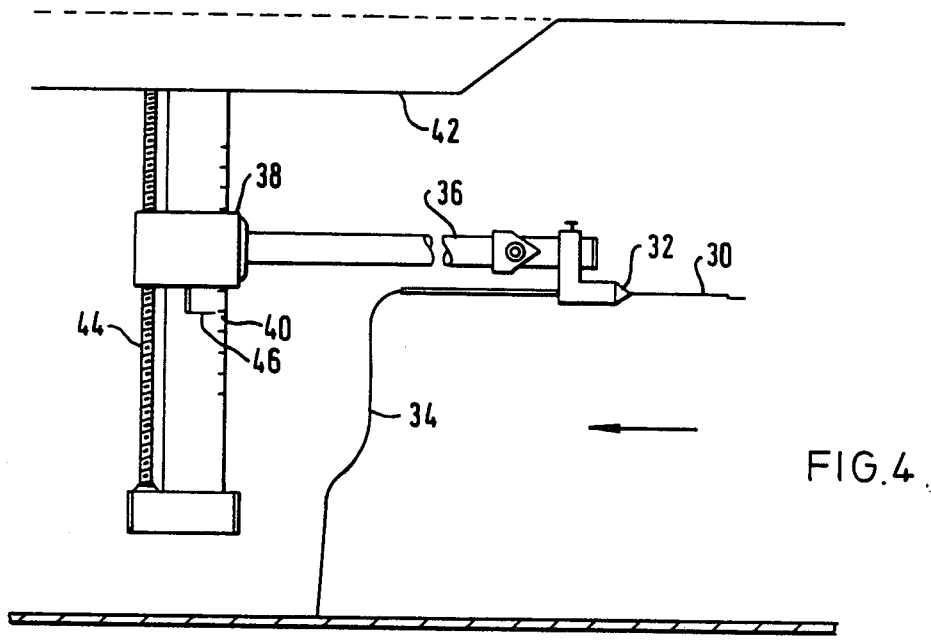
FIG. 4 is a side elevational view showing the probe mounting and traverse installation.
Figure 5:
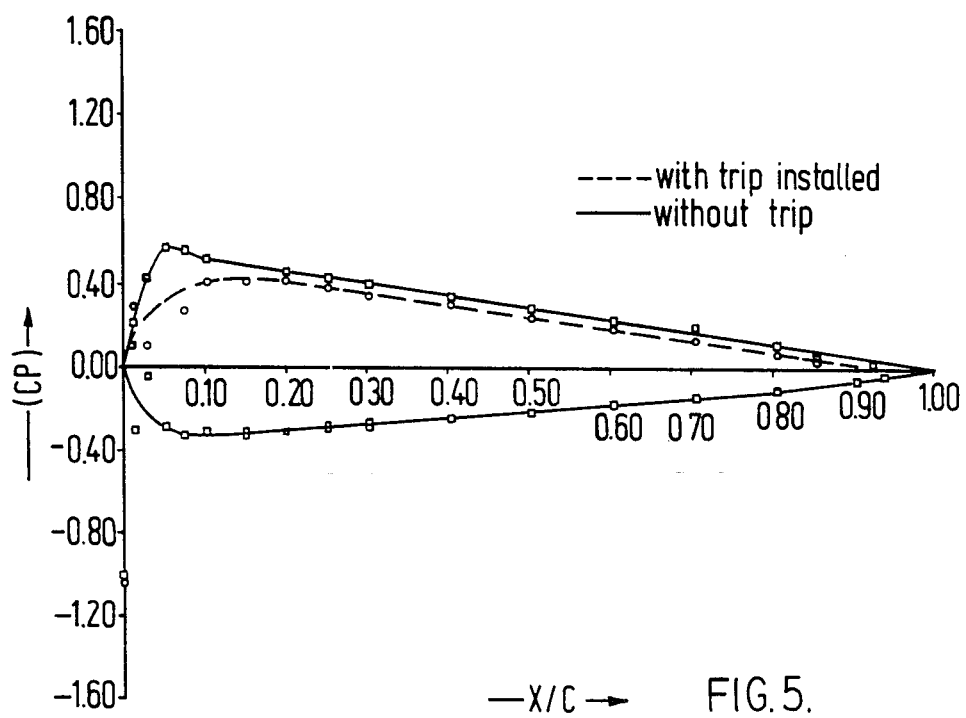
FIG. 5 is a graph of the aerofoil pressure distribution at an incidence of 0°.
Figure 6:
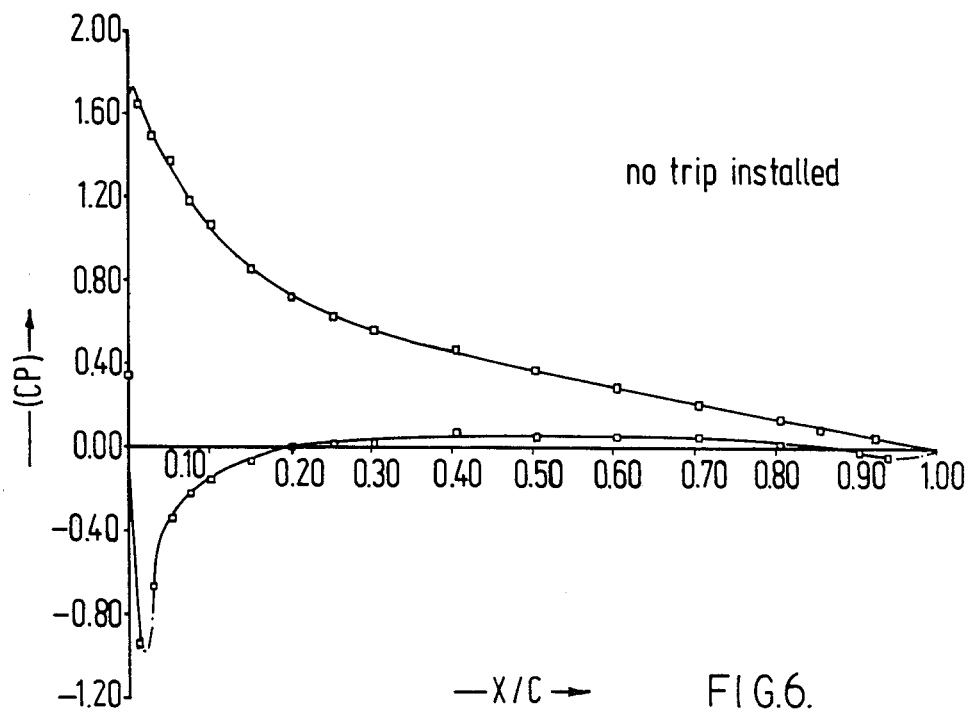
FIG. 6 is a graph of the aerofoil pressure distribution at an incidence of 5°.
Figure 7:
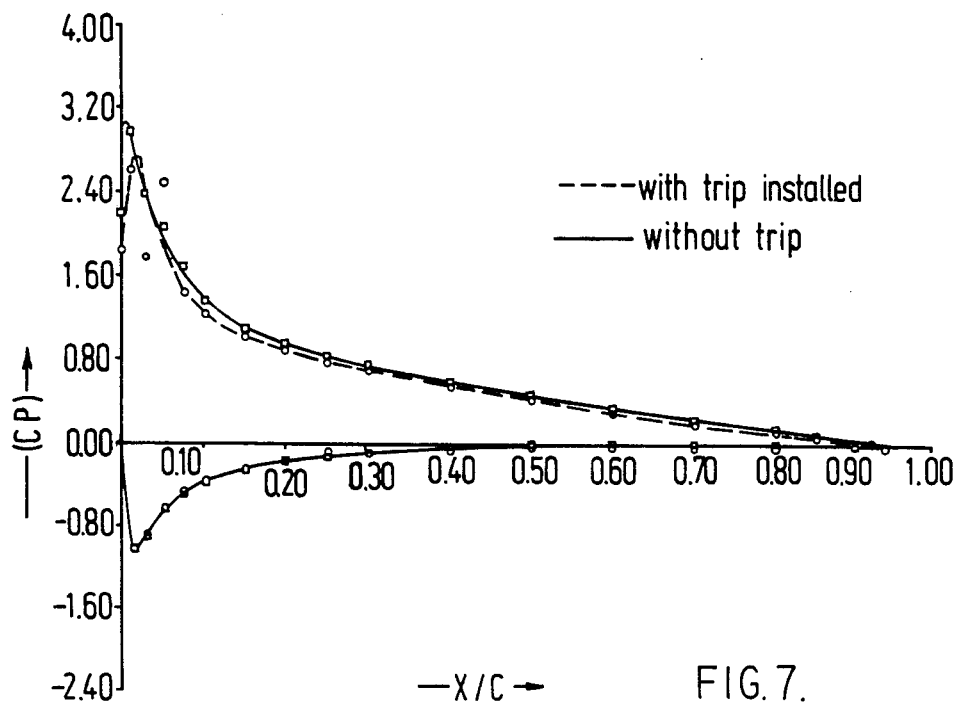
FIG. 7 is a graph of the aerofoil pressure distribution at an incidence of 8°.
Figure 8:
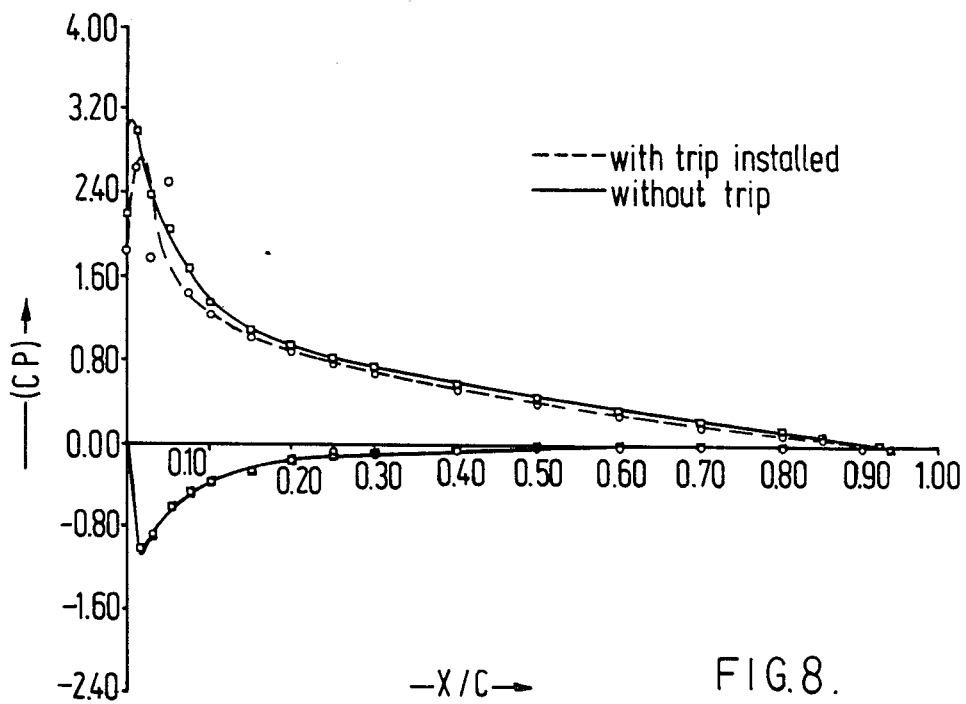
FIG. 8 is a graph of the aerofoil pressure distribution at an incidence of 10°.
Figure 9:
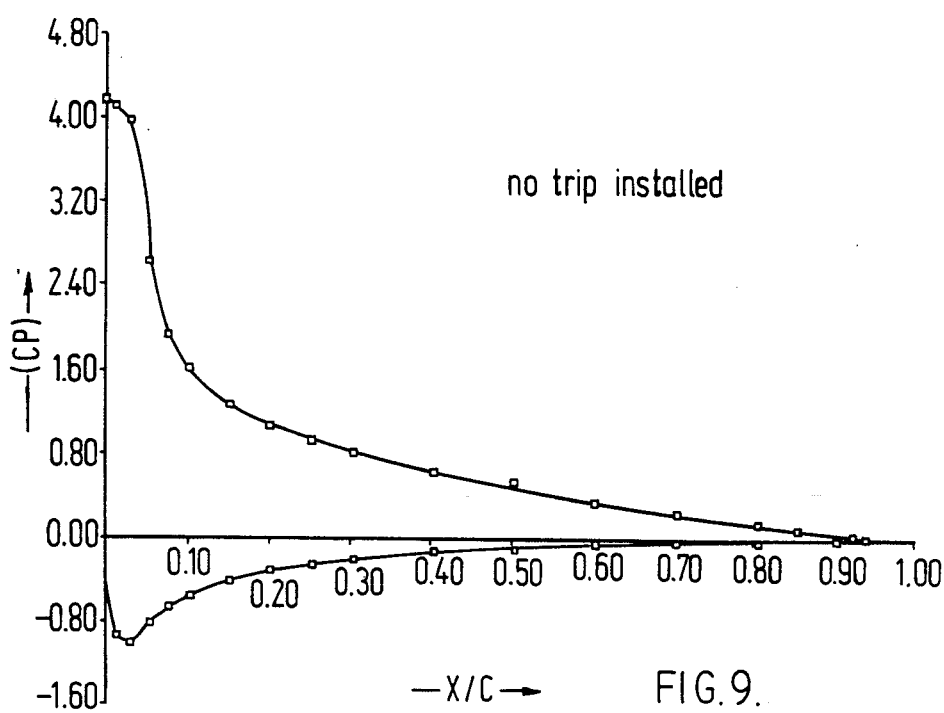
FIG. 9 is a graph of the aerofoil pressure distribution at an incidence of 11°.
Figure 10:
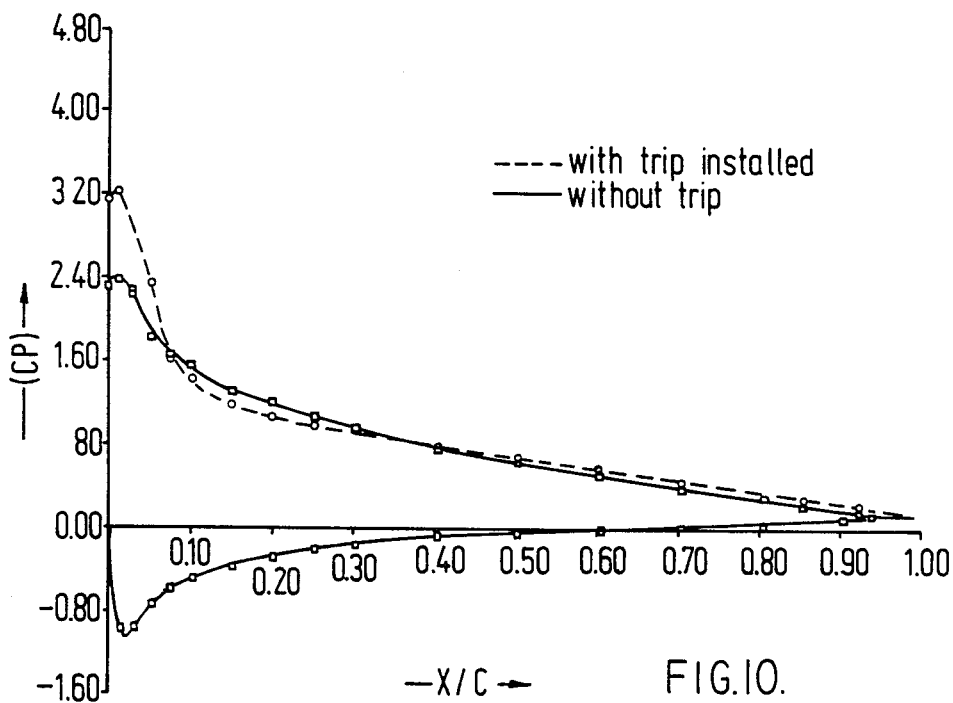
FIG. 10 is a graph of the aerofoil pressure distribution at an incidence of, 12°.

The probe mounting and traverse installation is shown in FIG. 4. The hot-wire probe 30 extends from a probe holder 32 which is connected to a multi-pin connector via an output wire 34. The probe holder 32 is at one end of an extensible arm 36, the other end of which is connected to a probe carrier 38. The probe carrier 38 is mounted on a scale 40 which is attached to the aluminium channel 42 in the roof of the tunnel. The probe carrier 38 is moved up and down the scale 40 by means of an electrically actuated vertical traverse, namely a screwjack 44 to alter the height of the probe 30 above the wing section 12, and the height of the hot-wire probe 30 is indicated by a pointer 46 on the scale 40.

There was no force-balance fitted in the tunnel, and the wing section 12 was fixed except for a provision to manually alter the incidence. The incidence was measured by a simple template and inclinometer.

The integrity of the pressure lines was tested, after which a series of runs was carried out to investigate the pressure distribution of the aerofoil and its stalling behaviour, with particular emphasis on the approach to the stall. Static pressure readings were recorded for nominal incidences of 0°, 5°, 8°, 10°, 11° and 12°, all at a test wind velocity of 17 m/s. The corresponding Reynolds number was $3.5 \times 10^5$ based on chord.

An elementary tuft survey was carried out using a single tuft mounted on a rod inserted into the tunnel. A tuft survey is a simple analysis of air flow patterns over the wing section 12 which broadly indicates the aerodynamic behaviour of the wing section, especially close to a stall. It consists of the attachment of cotton tufts to the aerofoil surface and observation of these tufts under varying conditions.

The time average velocity field was measured with the probe 30 connected to an electrical balancing bridge and the output was passed through a low-pass filter with a five second time constant before being displayed on a digital voltmeter. This data does not appear separately, but is used in the calculations of turbulence intensity to follow.

Turbulence intensity is defined here as the ratio of the root mean square velocity fluctuations (URMS) to the time average velocity (u). With the apparatus used, it was impossible to obtain a direct readout of this quantity; however a simple relationship between turbulence intensity and the ratio of RMS and time average voltage exists. An RMS readout was achieved by connecting the probe output to an RMS voltmeter (in parallel to the previously mentioned low-pass filter, etc.) and, purely for the convenience of its digital output as compared to the analogue output of the RMS device, a further digital voltmeter was installed in series.

With this equipment connected, a series of runs was carried out at nominal incidences of 8°, 9°, 10° and 11°, these representing the pre-stall region of most interest. For each incidence the probe 30 was traversed vertically from just above the aerofoil surface until there was no further decrease in turbulence intensity (i.e. until URMS became steady at the residual value corresponding to the inherent tunnel turbulence and probe interference effects, about 0.3% for these runs).

This series of traverses was carried out at two chordwise probe locations, corresponding to 33% and 66% chord. The percentage chord is the percent of the chord length by which the location is spaced from the leading edge.

Lastly, a trip-wire was taped to the uppper surface of the aerofoil near the leading edge, to ensure flow transition. All the runs were then repeated, including the pressure-distribution measurements. Due to interference effects, it was impractical to carry out tests with the probe in the 33% chord position with the trip-wire installed.

This series of runs completed the experimental work.

Figure 11:
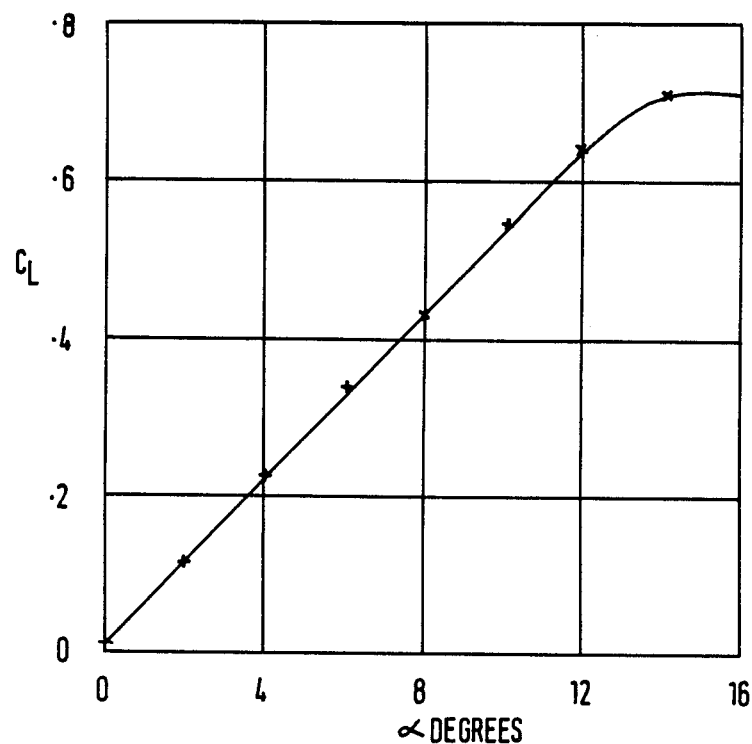
FIG. 11 is a graph of $C_L$, the coefficient of lift, mid-tunnel.
Figure 12:
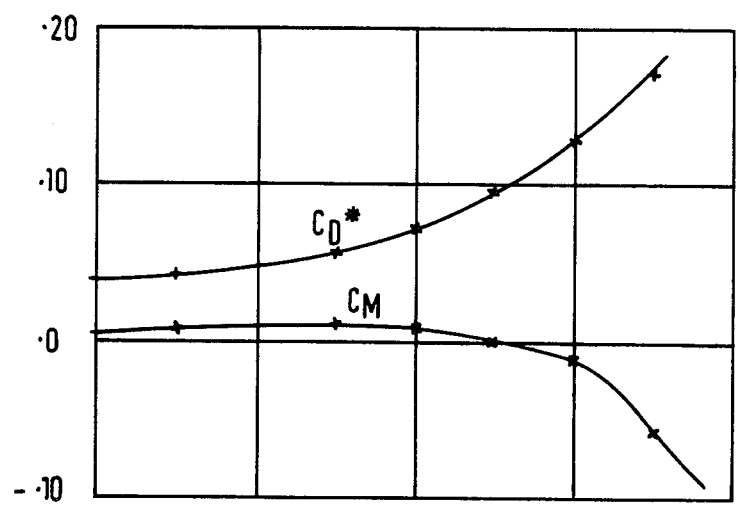
FIG. 12 is a graph of $C_D$, the coefficient of drag and $C_N$, the coefficient of pitching moment, mid-tunnel.
Figure 13:
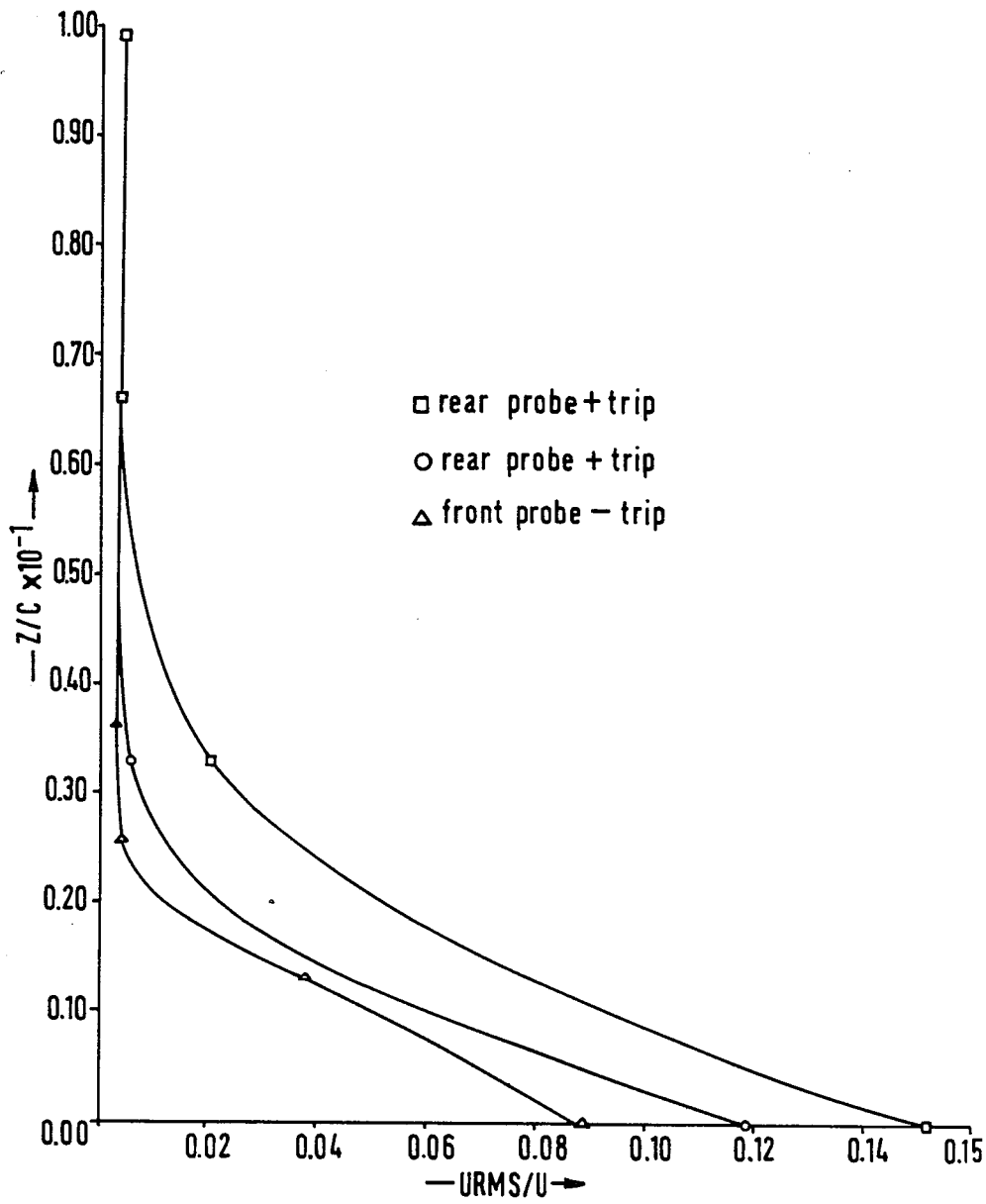
FIG. 13 is a graph of turbulence intensity of flow across a boundary layer at an incidence of 8°.
Figure 14:
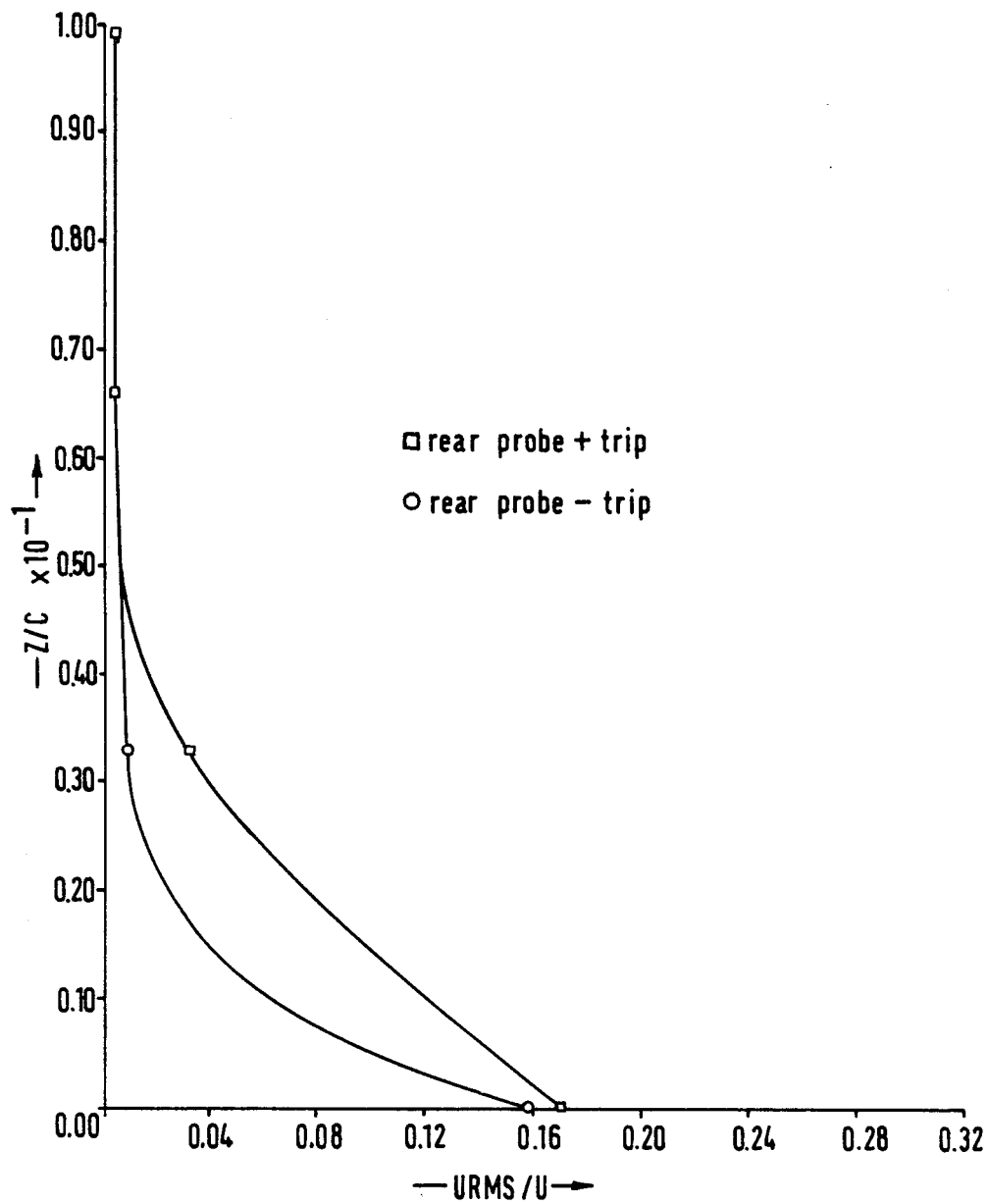
FIG. 14 is a graph of turbulence intensity of flow across a boundary layer at an incidence of 9°.
Figure 15:
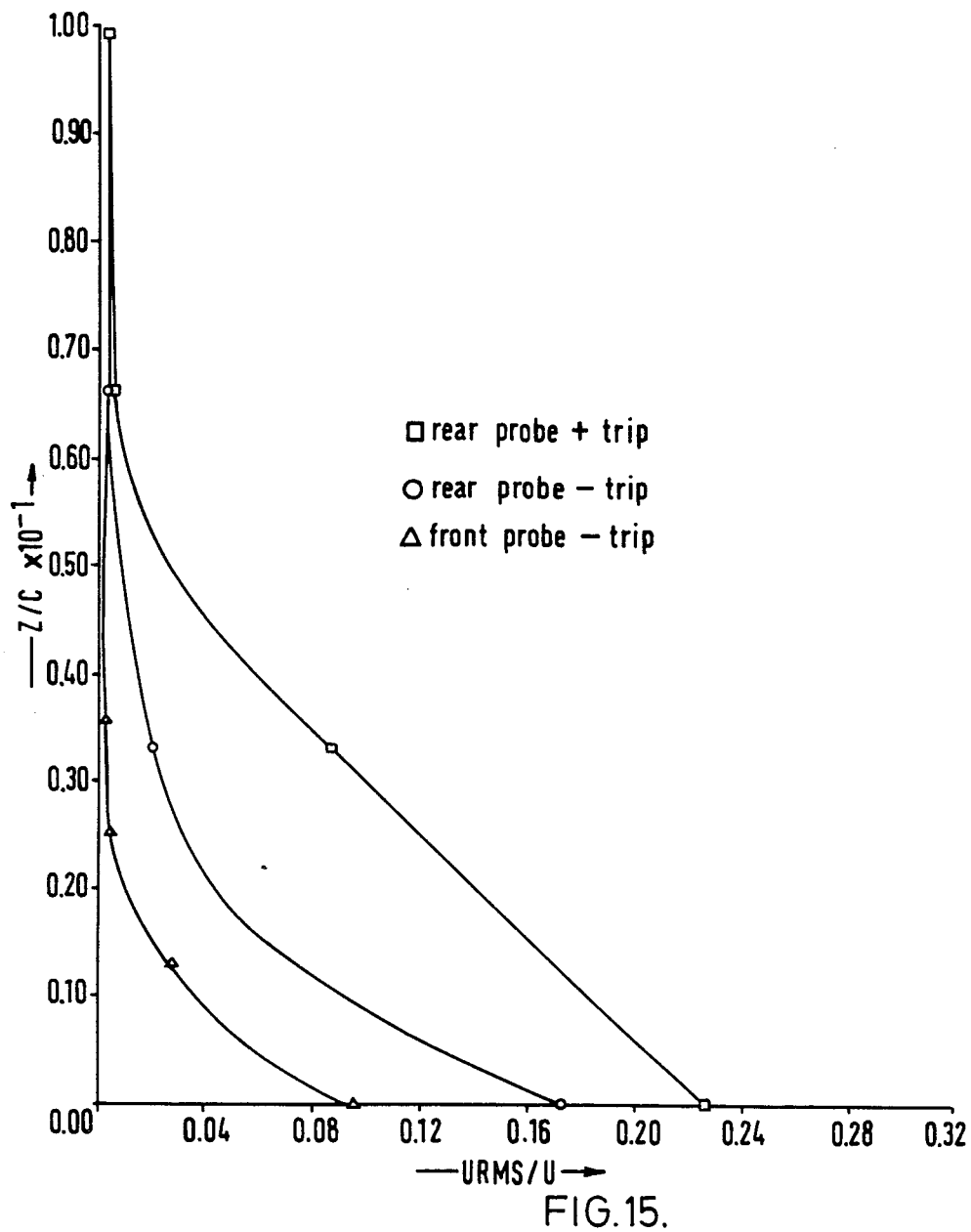
FIG. 15 is a graph of turbulence intensity of flow across a boundary layer at an incidence of 10°.
Figure 16:
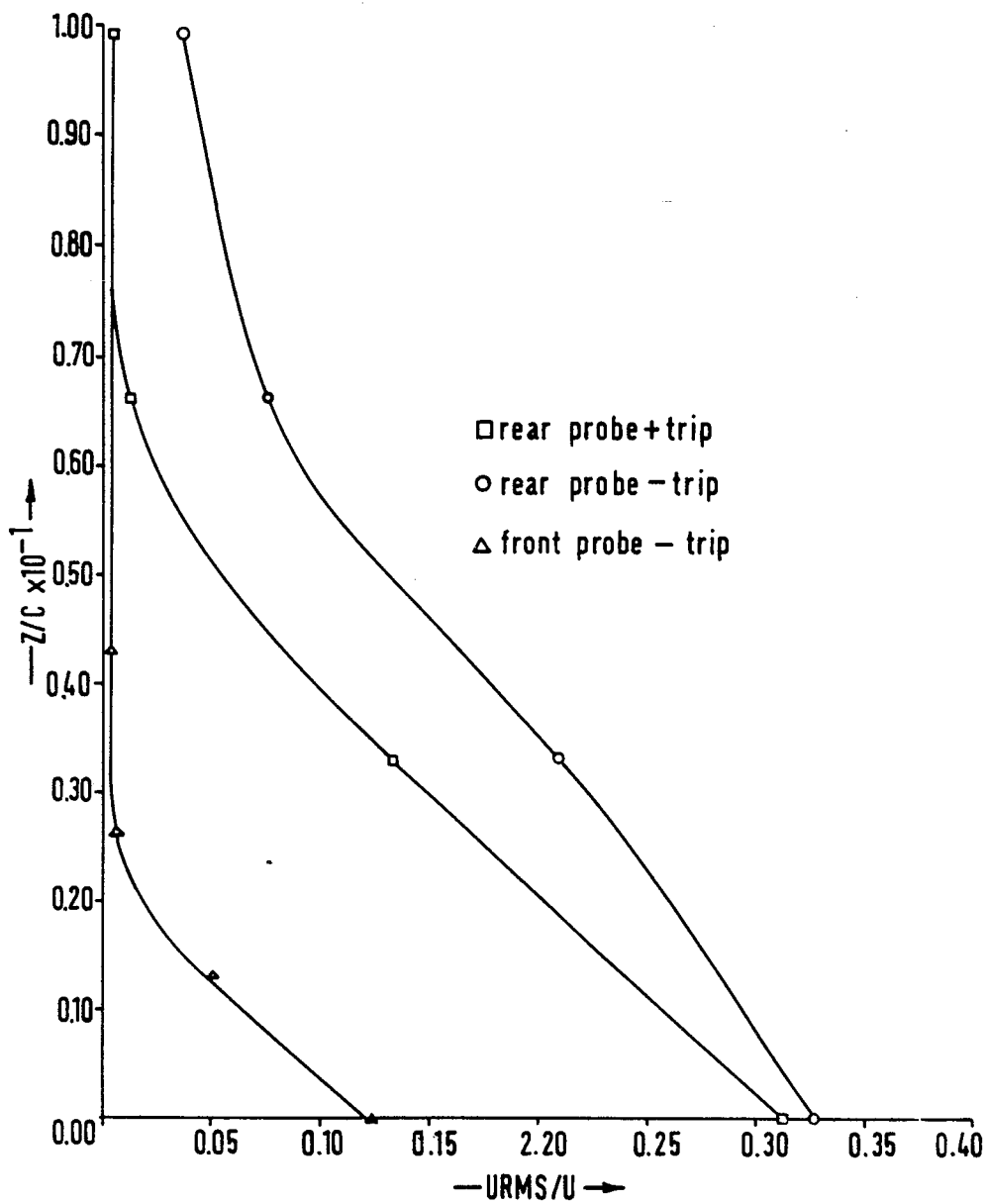
FIG. 16 is a graph of turbulence intensity of flow across a boundary layer at an incidence of 11°.

The readings were taken visually and then non-dimensionalised and static pressure profiles for the aerofoil were then plotted directly in the form (CP against x/c) for each incidence—CP is the suction (negative pressure), and x and c are as explained above. The results of these plots are shown in FIGS. 5 to 10 for various incidences ranging between 0° and 12°—the suction values above and below the wing section 12 are shown above and below the x/c axis, respectively (some taps are not plotted as they were not printed out by the computer). The graphs of the pressure distribution, along with the tuft study, clearly show the behaviour of the aerofoil with increasing incidence. FIGS. 11 and 12 show the behaviour of the coefficients of lift $C_L$, drag $C_D$, and pitching moment $C_N$, alpha being the incidence.

Initially the pressure distribution is flat, with the exception of stations just behind the trip-wire which show a marked increase in suction over the plain case. As the incidence increases, a pronounced suction peak develops, which is highly localized, being in evidence only in the front 20% of the chord. The lower surface contribution is slight, with a small pressure rise at the leading edge trailing off to a pressure coefficient of almost zero further aft, at all incidences.

Approaching the stall (which occurs above 12°), the suction peak collapses rapidly; in the case without the trip-wire, the suction decreases to about half its previous magnitude as the incidence rises from 11° to 12°. The tuft study shows the development of a flow "bubble" at the leading edge top-surface where the flow detaches before 5% chord and re-attaches at about 10%. This is uncharacteristic of full size aerofoils in common use, which tend to stall from the rear part first. For full size aerofoils, it is believed desirable to mount the probe above the aerofoil and aft of the 50% chord position, preferred positions being from around the 50% to around the 75% or 85% positions, the precise position (e.g. around the 66% position) varying from aircraft to aircraft.

At the stall, marked pressure fluctuations occur over the front of the wing section 12 to the order of 15%.

Finally, at incidences above the stalling angle, the pressure field collapses to become uniform over both the top and bottom aerofoil surfaces.

The accuracy of these results varies depending upon when the pressure readings were measured. Before the stall, the pressure readings were measured and reproduceable to 5%. This is shown in the good correlation between the pressure readings for the lower aerofoil surface, with and without the trip-wire. For a given nominal incidence these readings should be identical, and the graph shows this to be nearly the case.

Obviously, the upper surfaces differ because of the effect of the trip-wire.

A further analysis and reduction was required to process the probe output. The measured voltages were converted into values of turbulence intensity using an algorithm, although it is possible to perform this by the use of a stored look-up table. The normalised results have been plotted, with the graphs of the front probe, rear probe and rear probe with the trip-wire all superimposed, on FIGS. 13 to 16. They are plotted in the form URMS/u against z/c (height above wing section 12 expressed as a ratio of chord length), for the various incidences.

Since the turbulent air layer was a thin layer, only four observations were taken at each angle-of-attack. A suitable curve fit was plotted.

Figure 17:
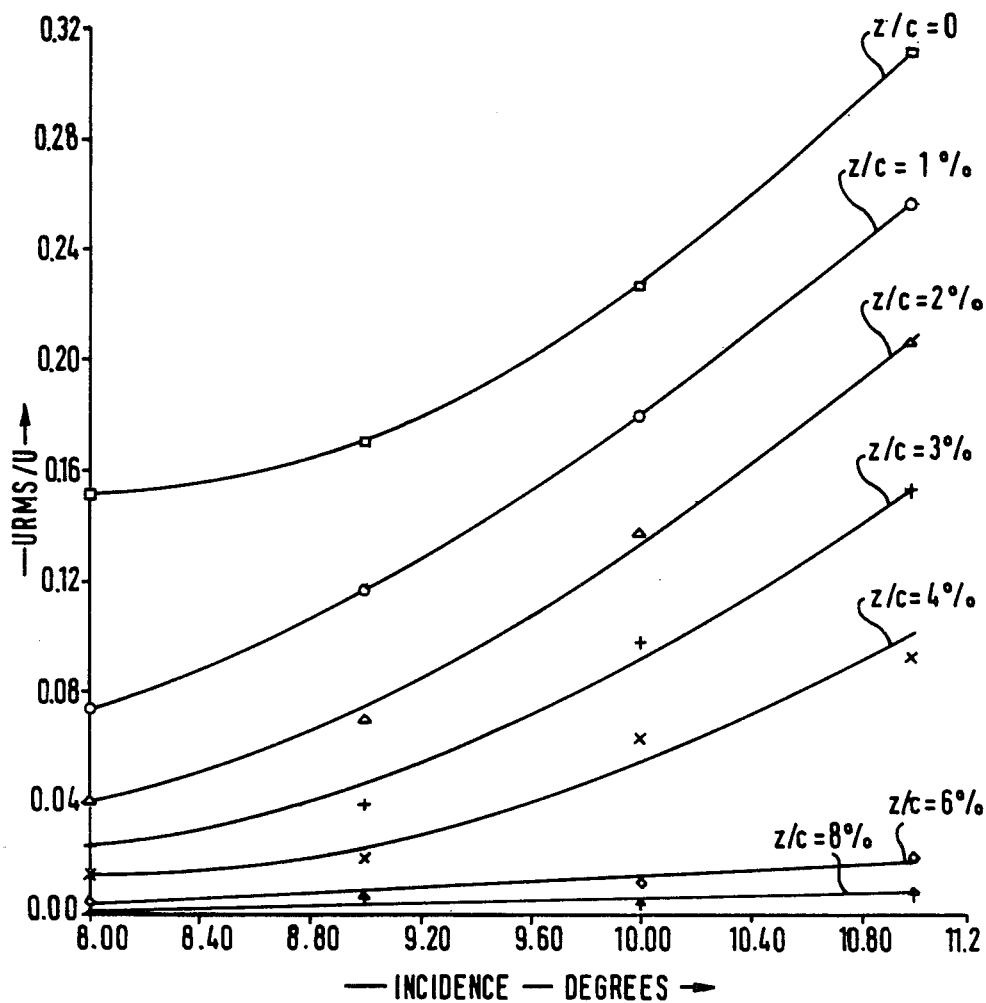
FIG. 17 is a graph of the probe turbulence response at various incidences.

The graph shown in FIG. 17 is a graph combining the results obtained from the measurements of turbulence intensity, and represents the relation between turbulence intensity and incidence for a family of probe heights above the aerofoil. It should be stressed that these curves are approximations based on the computer-generated interpolation of the data. The absolute values of the various quantities were of little importance to this study, so greater attention was paid to the form of the curves. However, it will be noted that the turbulence intensity can be continuously sensed and displayed if desired.

At low incidences, the turbulence intensity predictably decreased with increasing probe height above the wing section 12. The rear probe position with the trip-wire installed yields the greatest turbulence, followed by the rear probe without the trip, and finally by the front probe.

These observations are consistent with a thickening boundary layer towards the rear of the wing section 12, coupled with the transition from laminar to turbulent flow. This aspect shows up clearly when comparing the turbulence intensity with and without the trip-wire for the rear probe position. The trip-wire case is certain to have a turbulent boundary layer throughout while the plain case does not suffer transition until behind the probe location. The result is that the probe senses a greater turbulence intensity when the trip-wire is fitted, especially at low incidences.

At higher incidence, the turbulent region, that is to say, the region where the level of turbulence exceeds that of the probe/interference/tunnel effects, thickens slightly, while the intensity at any given station increases. At 11° incidence, the plain wing section 12 shows a very marked increase in turbulent activity, which exceeds that of the trip-wire case by up to 100%; this must be due to the plain wing section 12 (no trip-wire) stalling, at least partially. The resulting eddies from the front of the wing section 12 greatly increase the turbulence intensity further downstream. This leading-edge stall is certainly to blame, as evinced by the tuft study, which indicated few signs of airflow separation progressing forward from the trailing edge. The trip-wire ensures an early transition to the turbulent flow resulting in the mixing of higher energy air into the boundary layer. This more activated boundary layer stays attached until a higher incidence, resulting in fewer eddies and a lower turbulence level. This kind of behaviour, with an earlier transition to turbulent flow, is more representative of a full size aircraft.

The ideal requirements for the suggested approach to stall warnings are as follows:

1. The initial level of turbulence intensity should be low at small incidences.
2. The turbulence intensity should increase rapidly as the stall is approached. Consequently,
3. the ratio of the intensities just before, and well before the stall, should be high.

All these conditions are fully met for probe locations between 1 and 4% z/c.

This is best demonstrated by means of an example based on FIG. 17. Working on the assumption that a stall warning should be activated at an incidence of 10°, and choosing a probe mounted at 2% z/c, the following is observed:

The turbulence intensity (URMS/u) trebles between the incidences of 8 and 10 degrees. The sensitivity to changes of incidence near the stall is thus very high. On the other hand, it can be seen by extrapolation of the curves to low incidences, that the sensitivity in these regions is very low. This is obviously desirable because spurious warnings at safe incidence should be eliminated. This change in sensitivity is partly due to sensing the turbulence fluctuations as a percentage or ratio of the time average velocity.

The desirable results obtained above are examples of the best case. Performance should be almost as good for any of the probe heights between 1 and 4% z/c.

Outside the range, the operation is degraded, but is nevertheless in the correct sense—increasing incidences produce higher levels of turbulence intensity. Obviously, the probe 30 should not lie too far from the wing otherwise the turbulence starts off, and remains, at a very low level. Similarly, mounting the probe 30 well into the boundary layer produces too much "noise", again harming performance, so that it is in general preferable to mount the probe 30 above the normal boundary layer, where it will be directly exposed to the free airstream over the wing section 12 (the airstream is termed "free" although it will have been affected by the flow of air over the wing section 12, it being free in the sense that it is not affected by the boundary layer itself).

The apparatus can be arranged as a continuous display or continuous reading instrument, displaying progressively on a meter how close the wing section is to stalling, e.g. as a ratio or percentage of the turbulence intensity to the threshold value. The safety margin (threshold value) can be selected at will.

The above experiments demonstrated that the method is feasible. The fact that many of the results arrived at were in a non-dimensional form indicates that the results obtained on a small scale, as in the above described experiments, should be applicable to full scale aircraft wings. Naturally, this would require suitable calibration, and not all the instruments used in the experiments would be suitable for a full scale stall warning device based on the method of the present invention. For example, the hot-wire probe 30 used in the experiments is much too fragile in its present form to be used in full scale applications, but a more robust version of the hot-wire probe would be suitable for installation on a full scale aircraft wing. A suitable probe is a temperature-compensated quartz-covered wedge, conical or hemispherical type hot-film probe with surface toughening; only the first few thousandths of an inch of the front of the probe are sensitive, and thus there is no significant auto-generated turbulence. If the probe is bathed in water, it can be made to compensate as both the URMS and u values are altered. As the probe sensitive part is hot, icing need not be a problem.

PRACITCAL EMBODIMENT

Figures 18, 19:
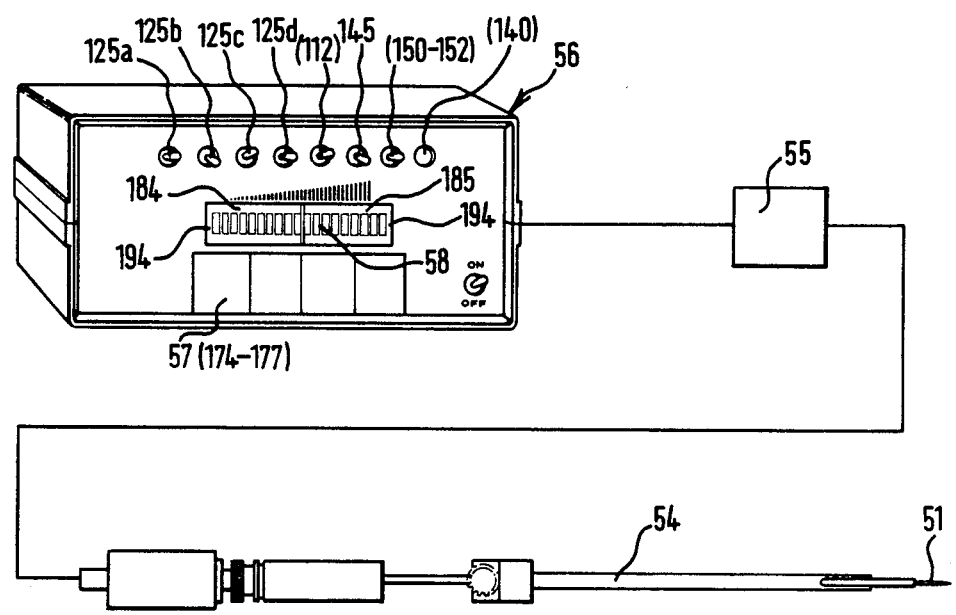
FIG. 18 is an end view of an aircraft wing, on which is mounted a probe of the invention.
FIG. 19 is a schematic view of a practical embodiment of the invention.

FIG. 18 shows a temperature-compensated hemispherical hot-film quartz-coated probe 51, with surface toughening, mounted on an aircraft wing 52 using a conventional mount 53; in practice, as explained below, there will be two or three spanwise-spaced probes 51. The tip of each probe 51 is preferably aft of the 50% chord position, e.g. at the 66% chord position which has been experimentally tested. Each probe 51 is a 1338 probe mounted on a 1150-6 probe support 54 (FIG. 19) and connected to a 1750 constant temperature anemometer bridge circuit (measuring bridge) 55, these designations being the designations of the supplier Thermo-Systems Inc. (TSI) of St. Paul, Minn. U.S.A. The probe 51 incorporates a temperature compensating winding or resistor in the tube immediately behind the thin leading rod. Each measuring bridge 55 is connected to a cockpit or flight-deck front panel box 56 which contains a computer.

In general terms, the signal obtained by the measuring bridge 55 is composed of a DC component with a superimposed 'ripple' or AC component. These correspond to the average airflow velocity and turbulence level respectively. The signals are separated (by a capacitor, for example) within the computer, and then converted from analog to digital form by an analog-to-digital converter. These digital representations of the airflow conditions are then processed further within the computer unit.

Specifically, the signals are converted to feet-per-second equivalents, because the output voltages from the measuring bridge 55 are not linear functions of airflow velocity. This conversion currently uses a fourth-order polynominal to translate volts into feet-per-second. Higher or lower orders could be used depending on the accuracy required. Because of these non-linearities, the AC signal is differentiated with respect to voltage in order to maintain its correct relationship with the DC component.

Finally, a ratio of root-mean-square (RMS) feet-per-second AC to feet-per-second DC is computed. This ratio is the "turbulence intensity".

The logic part of the computer examines the turbulence intensity and mean (DC) flow speed. If the mean speed is below a pre-stored threshhold (lower cut-off speed), the computer output is suppressed. This precludes extraneous indications when an aircraft is moving slowly on the ground. Above this cut-off threshold, the computer generates an output proportional to the measured turbulence intensity. This consists of a conventional four-digit display 57 (see 174–177 described below) of the turbulence intensity, as a percentage, which is used e.g. for calibrating, measurement taking or fault finding, and is switched off for normal flight. There is also a light-emitting-diode (LED) display 58 (see 184, 185 and 194 described below), which illuminates a variable number of LED bars corresponding to the turbulence intensity. When the mean speed is above the threshold, the display 58 automatically lights up.

The aircraft will still be accelerating on the ground, and the incidence is basically dictated by the geometry of the aircraft. However if say three bars light up, conditions may be difficult and if say five bars light up, there is too much turbulence, for instance due to icing on the wing. Thus, because turbulence and not incidence is being sensed, indications can be given before rotation. In normal flight and on approach, half the bars should be lit up, and the left-hand half can be orange and the right-hand half red. Standard outputs are also available to drive conventional flight instrument displays, pointers, meters, lights and so on, as required. Should the turbulence intensity exceed a preset value, then a warning condition arises, which can be made to activate buzzers, lights, stick-shakers, stick-pushers or any other peripheral, identifying an imminent stall. In addition the LED-bar scale starts to flash. The computer has ample capacity for expansion, and has a response rate faster than the eye can follow, i.e. when the signals change rapidly, the digits and display bars show no perceptible lags in indicating the new values.

The prototype computer is more sophisticated than an ordinary stall-warning system would need to be, in some respects, and would be a useful measuring tool for aerodynamic-research purposes. Its refinements include the following:

It has the capability to monitor multiple probes (e.g. up to six), sequentially. Many spanwise-spaced locations on the wing could thus be continuously monitored. In practice only one wing need be sampled, and two or three spanwise-spaced probes are sufficient; the probes are able to monitor the flow when flaps are lowered.

It can accept any DC/AC signal, regardless of its source. Instead of a heated-body probe, a microphone or other sensor could be utilized.

It has two preset trigger levels—one for "alarm" the other for "warning" purposes. They can cause different responses as required.

It incorporates full self-test capabilities to test all computational circuitry.

Warning levels, calibration factors, low-speed cut-off values and all flow-parameters can be displayed and altered instantly from the face of the unit, without disassembly.

A rate-term is included which can provide earlier warning if a stall condition is being approached rapidly.

The probe system is temperature compensated, to balance unwanted thermal effects.

Many of these features would be unnecessary on production units which would be designed for specific applications and hence would not need some of the flexibility of the prototype.

Figure 20:
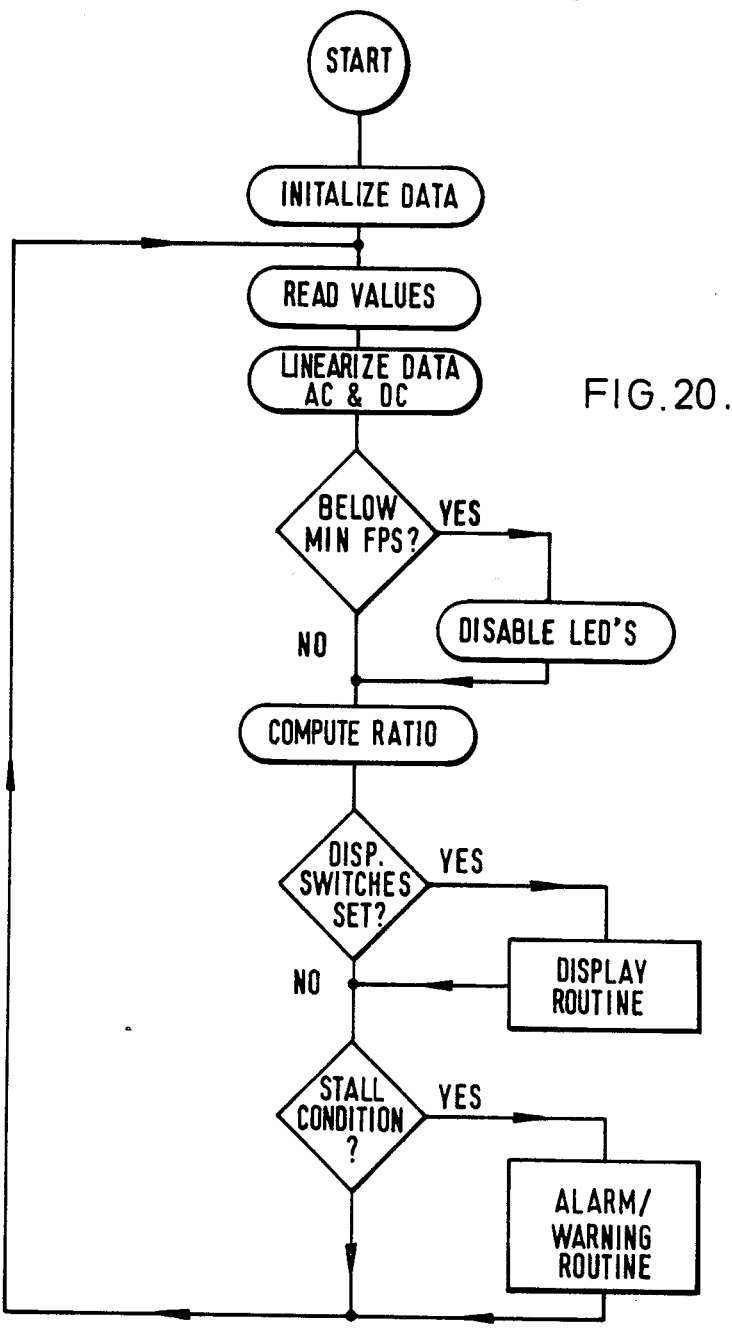
FIG. 20 is a simplified computer flow-chart for the invention.
Figure 21:
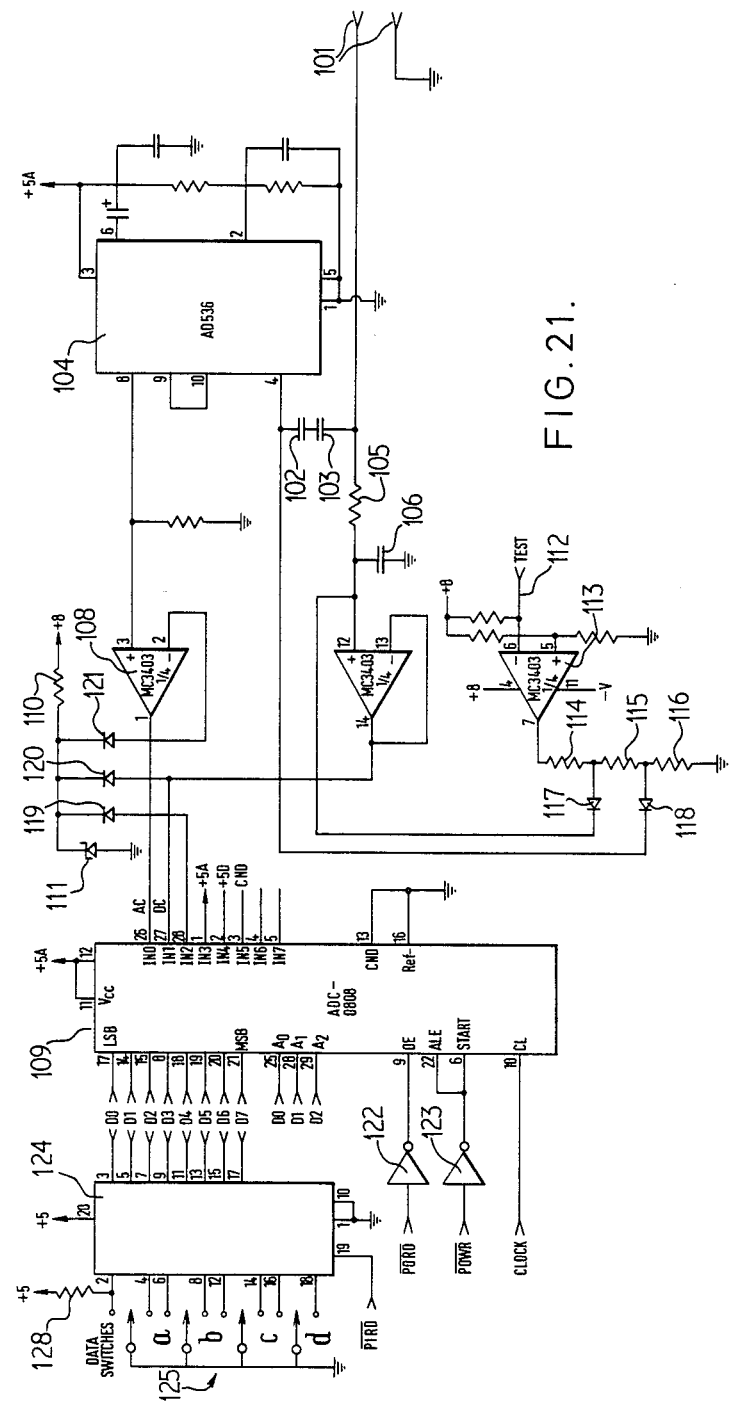
FIGS. 21, 22 and 23 are circuit diagrams for the computer in the practical embodiment.
Figure 22:
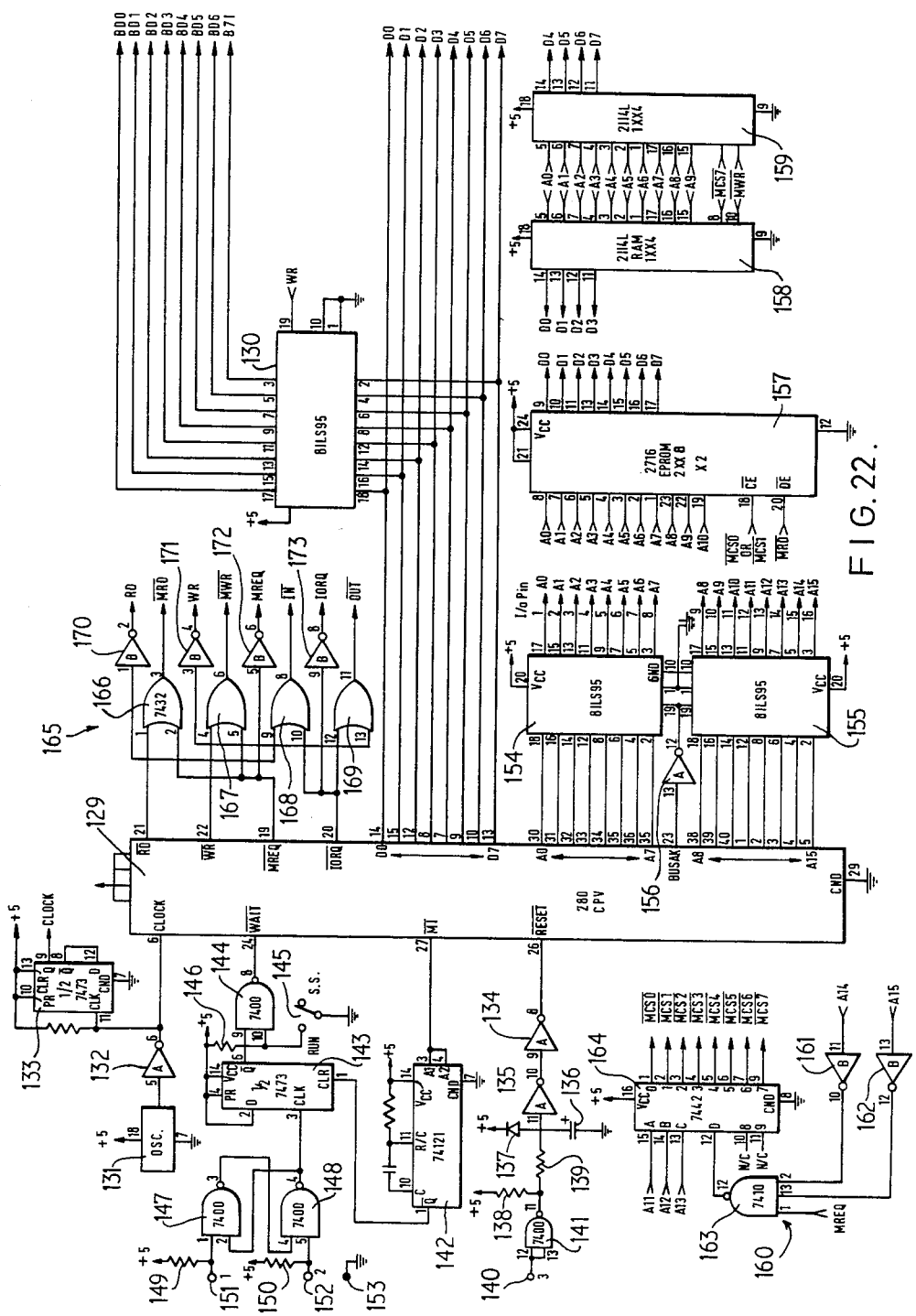
Figure 23:
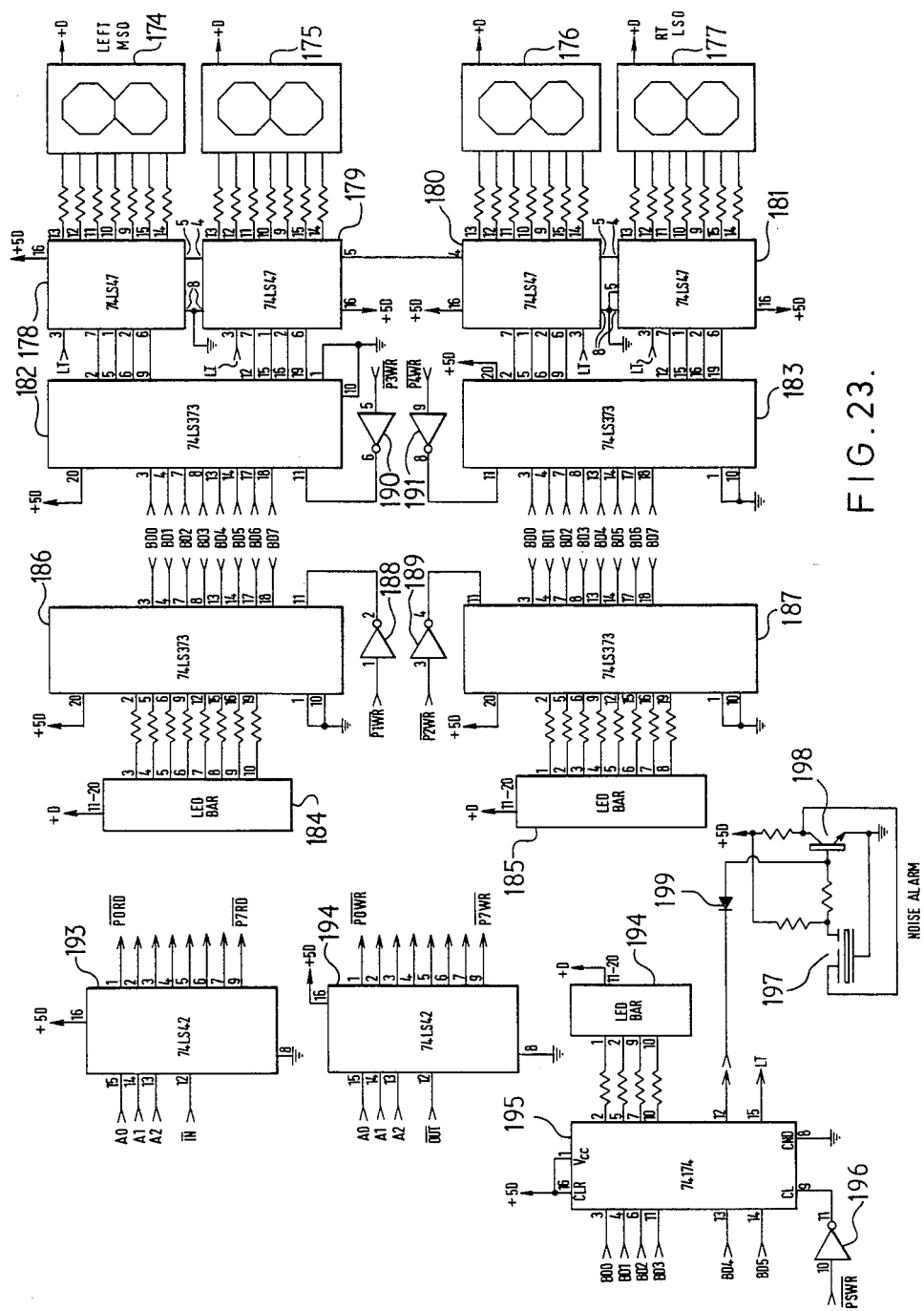

FIG. 20 gives a simplified computer flow-chart, a detailed description of the computer being given below in relation to FIGS. 21 to 23.

The circuit diagram shows the parts of the apparatus to which the measuring bridge is connected. The various integrated circuits are designated with the standard type number and the pin numbers have also been given. Various signal lines have also been referred to by the standard designations. These type numbers and standard designations are well known to the man skilled in the art.

The measuring bridge is connected to input terminals 101 and thence via capacitors 102 and 103 to the input of an integrated circuit 104 which, together with the associated resistors and capacitors, comprises an AC-to-RMS converter. The input terminals are also connected via a low pass filter comprising a resistor 105 and a capacitor 106 to an operational amplifier 107 connected as a voltage follower. The output of the integrated circuit 104 is similarly connected to an operational amplifier 108 connected as a voltage follower. The outputs of the operational amplifiers 107 and 108 are connected to respective inputs of a multiplexing analogue-to-digital converter integrated circuit 109. A further input of the integrated circuit 109 is connected to a voltage reference source comprising a resistor 110 and a zener diode 111. Further inputs of the integrated circuit 109 are connected to ground and to power supply rails.

A test switch (not shown) is connected to an input 112 of an operational amplifier 113 which, together with its associated resistors, comprises a comparator. The output of the comparator is connected to ground via a potential divider comprising resistors 114, 115, and 116. The tapping points of the potential divider are connected via diodes 117 and 118 to the inputs of the integrated circuit 104 and the operational amplifier 107 so as to supply predetermined voltages thereto when the terminal 112 is earthed via the test switch. The predetermined voltages are such as to simulate an alarm condition so as to allow operation of the apparatus to be tested.

The digitial outputs and address inputs of the integrated circuit 109 are connected to data and address buses. Positive excursions of the input terminals of the integrated circuit 109 are limited by means of diodes 119, 120, and 121 connected to the reference voltage source. The integrated circuit 109 is connected to two inverters 122 and 123 which receive control signals from the microprocessor described hereinafter.

An integrated circuit tri-state octal buffer 124 has outputs connected to the data bus and inputs connected to four change-over data switches 125a–d provided with pull-up resistors 128 (only one shown). The functions of the switches 125 will be further described hereinafter.

A microprocessor 129 is connected to the data bus and, via an integrated circuit tri-state octal buffer 130, to display output lines BDO–BD6 and B71. An oscillator 131 supplies clock pulses via an inverter 132 to the microprocessor 129 and via a divide-by-two circuit 133 to the converter integrated circuit 109.

A reset input of the microprocessor 129 is connected via inverters 134 and 135 to a reset circuit comprising a capacitor 136, a diode 137, and resistors 138 and 139 for initialising the microprocessor when power is applied to the apparatus. A reset switch (not shown) connected to a terminal 140 is also connected via a buffer 141 to the reset circuit so as to permit manual resetting of the apparatus. The output $\overline{MI}$ of the microprocessor is connected to an integrated circuit 142 which, together with the associated resistor and capacitor, comprises a monostable multivibrator whose output is connected to the clear input of a latch 143. The output of the latch is connected to an input of a NAND gate 144 whose output is connected to a $\overline{WAIT}$ input of the microprocessor 129. A switch 145 is connected, together with associated pull-up resistor 146 to the other input of the gate 144 and allows selection of the run mode or stop mode of the apparatus. The clock input of the latch 143 is connected to the output of a flip-flop comprising NAND gates 147 and 148. The flip-flop, together with the pull-up resistors 149 and 150 provides de-bouncing for a switch (not shown) connected to the terminals 151 to 153. This part of the circuit is provided for diagnostic functions only and will not be described further.

The address outputs of the microprocessor 129 are connected via integrated circuit tri-state octal buffers 154 and 155 to the address bus of the apparatus. A select signal is supplied via an inverter 156 to control inputs of the buffers 154 and 155. The microprocessor is provided with a read only memory integrated circuit 157 for storing the operating program and with random access memory integrated circuits 158 and 159. Address lines AII to A15 are connected to a chip-select circuit 160, whose outputs are connected to chip-select lines MCSO to MCS7. The circuit 160 comprises inverters 161 and 162, a NAND gate 163, and a BCD-to-decade converter integrated circuit 164.

Control outputs of the microprocessor 129 are connected to a circuit arrangement 165 for providing control signals to other parts of the apparatus. The circuit arrangement 165 comprises four OR gates 166 to 169 and four inverters 170 to 173.

The apparatus includes four seven-segment displays 174 to 177 whose segments are connected via current-limiting resistors to the outputs of four BCD-to-7-segment converter integrated circuits 178 to 181. The inputs of the converters 178 to 181 are connected to two octal latch integrated circuits 182 and 183.

Two light emitting diode bar displays 184 and 185 are connected via current-limiting resistors to two further octal latch integrated circuits 186 and 187. Multiplexing and selection of the displays is performed by means of inverters 188 to 191 and BCD-to-decade converter integrated circuits 192 and 193.

A further light emitting diode bar display 194 is connected to a latch integrated circuit 195 which receives clock signals via an inverter 196. The latch 195 also controls, via a diode 199, a piezo-electric buzzer 197 for providing an audible warning. The buzzer forms part of an oscillator comprising a transistor 198 and associated resistors.

The functions of the four data switches 125a–d and of the various displays will now be described. The first data switch 125a has two positions FPS and FSD. The second data switch 125b has two positions ALM and WRN. The third data switch 125c has two positions FAC and R. These three switches are each biassed to a centre position in which no contact is made. The fourth switch 125d has a first position FDC and a second position to which it is normally biassed.

When the third switch is moved to its position FAC with none of the other data switches actuated, the four seven-segment displays indicate the turbulence in feet per second. When the third switch is moved to its position R and none of the other data switches is operated, the four seven-segment displays indicate the ratio of turbulence to airspeed, which is derived from the ratio of the RMS signal to the DC signal from the measuring bridge. When the fourth data switch is moved to its position FDC with none of the other data switches operated, the four seven-segment displays indicate the airspeed in feet per second.

When the first data switch is moved to its position FPS, the lower cut-off speed, below which the apparatus does not respond so as to prevent incorrect warning during taxiing of an aircraft, may be set by operation of the third and fourth switches to the positions FAC and FDC for setting the "tens" and "units" of the cut-off speed, which is simultaneously displayed by the four seven-segment displays. When the first data switch is in its position FSD, operation of the third and fourth switches allows the scale factor of the LED bar display to be adjusted, the scale factor also being displayed on the four seven-segment displays. The LED bar display provides an "analogue" display of the ratio of turbulence to airflow.

When the second data switch is in its position ALM, the threshold value of the ratio of turbulence to airspeed at which an audible alarm provided by the piezo-electric buzzer 197 is provided may be set by means of the third and fourth data switches as described above, with the threshold value being displayed on the four seven-segment displays. When the second data switch is in its position WRN, the threshold of the ratio of turbulence to airspeed at which the outer bars of the LED bar display flash may be set by the third and fourth data switches with the threshold being indicated by the four seven-segment displays, as described above.

I claim:

1. Apparatus for predicting the approaching stall of an aircraft wing, comprising:
   means for sensing airspeed over the wing at a predetermined location spaced above the top surface of the wing and for thereby producing input signals representative of airspeed fluctuations at said location, said fluctuations being caused by air turbulence over the wing;
   means for using said input signals to produce a signal representative of the ratio of the airspeed fluctuations at said location to the average airspeed at said location; and
   means for using said ratio signal to produce a signal indicative of imminent stalling.

2. Apparatus for predicting the approaching stall of an aircraft wing, comprising:
   means directly exposed to the free airstream over the wing for sensing the speed of the free airstream at a predetermined location spaced above the top surface of the wing and above the boundary layer, to thereby produce input signals representative of airspeed fluctuations at said location, said fluctuations being caused by air turbulence over the wing;
   means for using said input signals to produce a signal representative of the ratio of the airspeed fluctuations at said location to the average airspeed at said location, and
   means for using said ratio signal to produce a signal indicative of imminent stalling.

3. The apparatus of claim 1 or 2, wherein said sensing means comprises a heated body probe means.

4. The apparatus of claim 1 or 2, wherein said means for using said input signals is for continuously producing a signal representative of the ratio of the airspeed fluctuations at said location to the average airspeed at said location.

5. The apparatus of claim 1 or 2, wherein said means for using said input signals is for producing a signal indicative of imminent stalling when the air turbulence exceeds an airspeed dependent threshold, and wherein rate-term means are included to initiate an earlier warning signal if said turbulence threshold is rapidly approached.

6. The apparatus of claim 1 or 2, wherein there is a plurality of said sensing means, for mounting at a plurality of said locations, spaced spanwise along said wing, there being a single said using means responsive to all said sensing means.

* * * * *